United States Patent
Giguère et al.

(10) Patent No.: US 11,497,172 B2
(45) Date of Patent: Nov. 15, 2022

(54) WRAPPING MECHANISM PROTECTION DEVICE FOR BALE WRAPPING APPARATUS

(71) Applicant: GROUPE ANDERSON INC., Chesterville (CA)

(72) Inventors: Alexandre Giguère, St-Christophe d'Arthabaska (CA); Patrice Desrochers, St-Christophe d'Arthabaska (CA); Jacques Breton, Chesterville (CA); Michaël Gagnon-Bouchard, Ham-Nord (CA)

(73) Assignee: GROUPE ANDERSON INC., Chesterville (CA)

(*) Notice: Subject to any disclaimer, the term of this patent is extended or adjusted under 35 U.S.C. 154(b) by 366 days.

(21) Appl. No.: 16/689,721

(22) Filed: Nov. 20, 2019

(65) Prior Publication Data
US 2021/0144926 A1    May 20, 2021

(51) Int. Cl.
*A01F 15/07* (2006.01)
*B65B 11/00* (2006.01)
*A01F 25/14* (2006.01)

(52) U.S. Cl.
CPC ........... *A01F 15/071* (2013.01); *A01F 25/14* (2013.01); *B65B 11/008* (2013.01); *A01F 2015/073* (2013.01); *A01F 2015/0725* (2013.01); *A01F 2025/142* (2013.01)

(58) Field of Classification Search
CPC ........... A01F 2015/0725; A01F 15/071; A01F 2015/073; B65B 11/008

USPC .................................................. 53/218, 556
See application file for complete search history.

(56) References Cited

U.S. PATENT DOCUMENTS

| | | | | |
|---|---|---|---|---|
| 4,524,568 A | * | 6/1985 | Lancaster | B65B 11/008 53/441 |
| 4,793,124 A | * | 12/1988 | Anderson | A01F 15/071 53/556 |
| 5,012,631 A | * | 5/1991 | Hostetler | A01F 15/071 53/556 |
| 5,123,230 A | * | 6/1992 | Upmann | B65B 11/045 53/504 |
| 5,152,125 A | * | 10/1992 | Laver | A01F 15/071 53/210 |
| 5,404,691 A | * | 4/1995 | Scherer | B65B 11/025 53/399 |
| 5,433,058 A | * | 7/1995 | Peterson | A01F 15/071 53/389.3 |
| 5,596,864 A | * | 1/1997 | Reeves | A01F 15/071 53/399 |

(Continued)

*Primary Examiner* — Robert F Long
*Assistant Examiner* — Xavier A Madison
(74) *Attorney, Agent, or Firm* — Middleton Reutlinger (57) ABSTRACT

A wrapping mechanism protection device which is adapted and configured to prevent a dispensed wrapping film to interface with crop debris of hay, straw, corn straw, etc. extending from a formed bale when the bale is being ready to be wrapped is disclosed. More particularly, the present disclosure describes a film-carrying device which comprises a film-carrying main frame, a spool holder rotatably mounted on the film-carrying main frame for mounting a spool of the wrapping film thereon, and a wrapping mechanism protection device extending from the film-carrying main frame and being configured to prevent the bale received in the frame to interface with the wrapping film when the bale is being wrapped.

20 Claims, 10 Drawing Sheets

(56) References Cited

U.S. PATENT DOCUMENTS

| | | | | |
|---|---|---|---|---|
| 6,070,400 | A * | 6/2000 | Peeters | A01F 15/071 53/588 |
| 7,516,694 | B1 * | 4/2009 | Eifler | B65B 27/10 100/27 |
| 7,707,802 | B2 * | 5/2010 | Forrest | B65B 11/025 53/399 |
| 2011/0197548 | A1 * | 8/2011 | Bauer | A01F 15/071 53/203 |
| 2012/0180430 | A1 * | 7/2012 | Lavoie | B65B 11/008 53/203 |
| 2016/0106041 | A1 * | 4/2016 | Thompson | A01F 15/071 53/399 |
| 2016/0183473 | A1 * | 6/2016 | Horst | A01F 25/14 53/588 |

* cited by examiner

WRAPPING MECHANISM PROTECTION DEVICE FOR BALE WRAPPING APPARATUS

TECHNICAL FIELD

The present disclosure relates to the field of bale wrapping. More particularly, the present disclosure relates to a wrapping mechanism protection device for a bale wrapping apparatus.

BACKGROUND

In the agricultural field, crop such as, for example and without being limitative hay, straw, corn straw or the like, is typically shaped in bales for handling and storage. The baled material is commonly subsequently wrapped in wrapping film such as a plastic wrapping film, for example in order to eventually turn the crop into fodder.

According to different factors such as, for example and without being limitative, the production needs of the farmers, the storage space, individual preferences, etc., the bales can be wrapped individually or as a tube containing multiple bales continuously wrapped together. Apparatus which can wrap bales individually or inline (i.e. together in a tube) are known in the art.

Some of them may include a bale wrapping mechanism for wrapping the bale received therein with the wrapping film. The bale wrapping mechanism may include a frame which defines a perimeter configured to circumference the bale and a middle section aperture configured to receive the bale therein. Such bale wrapping mechanism may further include a film-carrying device which is operatively mounted to the frame for travelling along the perimeter and for dispensing the wrapping film to at least partially wrap the bale. The film-carrying device usually comprises a film-carrying main frame, a spool holder rotatably mounted on the film-carrying main frame for mounting a spool of the wrapping film thereon and optionally, a tensioner, also mounted on the film-carrying main frame at a distance from the spool holder for tensioning the wrapping film being dispensed. Such known agricultural machinery dedicated to bale wrapping and which can perform individual bale wrapping and/or inline bale wrapping however tend to suffer from several drawbacks.

Indeed, when the bale is ready to be wrapped and is positioned in the bale wrapping mechanism of the bale wrapping apparatus, crop debris extending from the formed bale such as, for example and without being limitative corn straw debris or the like, tend to interface with the wrapping film travelling from the spool to the tensioner and/or from the tensioner to the bale, thus perforating parts of the wrapping film and/or cutting sections of the wrapping film, prior to the wrapping film reaching the bale. Storing a wrapped bale of which the wrapping film has been damaged during the wrapping process (e.g. perforated, cut, etc.) may negatively impart on the process of turning the crop into fodder. Most of the time, the bale needs to be unwrapped, and re-wrapped, or alternatively, more plastic material is needed to adequately and completely wrap the bale. Such alteration of the wrapping film can therefore lead to additional steps that need to be performed by the farmer, and therefore, to an economic loss (loss of time, loss of material, etc.).

In view of the above, there is therefore a need for an improved wrapping mechanism protection device for a bale wrapping apparatus which, by virtue of its design and components, would be able to overcome or at least minimize some of the above-discussed concerns.

SUMMARY

It is an object of the present disclosure to provide a wrapping mechanism protection device for a bale wrapping apparatus that overcomes or mitigates one or more disadvantages of known bale wrapping apparatus or at least provides a useful alternative.

According to an embodiment, there is provided a bale wrapping mechanism for wrapping a bale received therein with a wrapping film, the bale wrapping mechanism comprising: a frame defining a perimeter configured to circumference the bale and a middle section aperture configured to receive the bale therein; and a film-carrying device operatively mounted to the frame for travelling along the perimeter and for dispensing the wrapping film to at least partially wrap the bale, the film-carrying device comprising: a film-carrying main frame; a spool holder rotatably mounted on the film-carrying main frame for mounting a spool of the wrapping film thereon; and a wrapping mechanism protection device extending from at least one of: the frame and the film-carrying main frame and being configured to prevent the bale received in the frame to interface with the wrapping film when the bale is being wrapped.

According to another embodiment, there is provided the bale wrapping mechanism as defined above, wherein the film-carrying device further comprises a tensioner mounted on the film-carrying frame at a distance from the spool holder for tensioning the wrapping film being dispensed, the wrapping mechanism protection device being further configured to prevent the bale received in the frame to interface with the dispensed wrapping film traveling towards the tensioner when the bale is being wrapped.

According to a further embodiment, there is provided the bale wrapping mechanism as defined above, wherein the film-carrying main frame comprises spaced apart longitudinal members for rotatably mounting the spool holder.

According to yet another embodiment, there is provided the bale wrapping mechanism as defined above, wherein the film-carrying main frame further comprises a first transversal member joining the spaced apart longitudinal members.

According to another embodiment, there is provided the bale wrapping mechanism as defined above, wherein the film-carrying main frame further comprises a second transversal member distant from the first transversal member, the second transversal member joining the spaced apart longitudinal members.

According to a further embodiment, there is provided the bale wrapping mechanism as defined above, wherein one of the spaced apart longitudinal members defines a first longitudinal member axis, the other one of the spaced apart members defines a second longitudinal member axis, the first transversal member defines a first transversal member axis, the second transversal member defines a second transversal member axis, the first and second longitudinal member axis being substantially perpendicular to the first and second transversal member axis.

According to yet another embodiment, there is provided the bale wrapping mechanism as defined above, wherein the wrapping mechanism protection device defines first and second ends, at least one of the first and second ends of the wrapping mechanism protection device being mounted at at least one of the first and second transversal members.

According to another embodiment, there is provided the bale wrapping mechanism as defined above, wherein the first end of the wrapping mechanism protection device is being mounted on the first transversal member.

According to a further embodiment, there is provided the bale wrapping mechanism as defined above, wherein the wrapping mechanism protection device defines a first surface and a second surface extending from the first surface at a first angle.

According to yet another embodiment, there is provided the bale wrapping mechanism as defined above, wherein the wrapping mechanism protection device defines a third surface extending from the second surface at a second angle.

According to another embodiment, there is provided the bale wrapping mechanism as defined above, wherein the wrapping mechanism protection device defines space apart longitudinal edges and further wherein the wrapping mechanism protection device comprises spaced apart connection sections extending at respectively the spaced apart longitudinal edges to connect the wrapping mechanism protection device to the film-carrying main frame.

According to a further embodiment, there is provided the bale wrapping mechanism as defined above, wherein one of the spaced apart connection sections perpendicularly extends from the first surface of the wrapping mechanism protection device at one of the spaced apart longitudinal edges, and further wherein the other one of the spaced apart connection sections perpendicularly extends from the first surface of the wrapping mechanism protection device at the other one of the spaced apart longitudinal edges.

According to yet another embodiment, there is provided the bale wrapping mechanism as defined above, wherein the wrapping mechanism protection device is releasably coupled to the film-carrying main frame.

According to another embodiment, there is provided a film-carrying device for a bale wrapping mechanism adapted to wrap a bale received therein with a wrapping film, the bale wrapping mechanism comprising a frame defining a perimeter configured to circumference the bale and a middle section aperture configured to receive the bale therein, the film carrying device being adapted to be operatively mounted to the frame for travelling along the perimeter and to dispense the wrapping film to at least partially wrap the bale, the film-carrying device comprising: a film-carrying main frame; a spool holder rotatably mounted on the film-carrying main frame for mounting a spool of the wrapping film thereon; and a wrapping mechanism protection device extending from the film-carrying main frame and being configured to prevent the bale received in the frame to interface with the wrapping film when the bale is being wrapped.

According to a further embodiment, there is provided the film-carrying device as defined above, further comprising a tensioner mounted on the film-carrying frame at a distance from the spool holder for tensioning the wrapping film being dispensed, the wrapping mechanism protection device being further configured to prevent the bale received in the frame to interface with the dispensed wrapping film travelling from the spool holder towards the tensioner when the bale is being wrapped.

According to yet another embodiment, there is provided the film-carrying device as defined above, wherein the film-carrying main frame comprises spaced apart longitudinal members for rotatably mounting the spool holder, a first transversal member joining the spaced apart longitudinal members and a second transversal member at a distance from the first transversal member, the second transversal member joining the spaced apart longitudinal members.

According to another embodiment, there is provided the film-carrying device as defined above, wherein the wrapping mechanism protection device defines a first surface and a second surface extending from the first surface at a first angle.

According to a further embodiment, there is provided the film-carrying device as defined above, wherein the wrapping mechanism protection device defines a third surface extending from the second surface at a second angle.

According to yet another embodiment, there is provided the film-carrying device as defined above, wherein the wrapping mechanism protection device defines space apart longitudinal edges and further wherein the wrapping mechanism protection device comprises spaced apart connection sections extending from the spaced apart longitudinal edges to connect the wrapping mechanism protection device to the film-carrying main frame.

According to another embodiment, there is provided the film-carrying device as defined above, wherein the wrapping mechanism protection device defines first and second ends, at least one of the first and second ends of the wrapping mechanism protection device being mounted at at least one of the first and second transversal members.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIGS. 3A to 3C are views of the bale wrapping apparatus of FIG. 1 which is configured in the inline bale wrapping configuration, showing different stages a sequence of operation which provides the wrapping of multiple bales in a single tube, where:

FIGS. 4A and 4B are views of the bale wrapping apparatus of FIG. 2 which is configured in the single bale wrapping configuration and showing a stage of a sequence of operation which provides the wrapping of a single bale, where

DETAILED DESCRIPTION

In the following description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures or described in the present disclosure are embodiments only, given solely for exemplification purposes.

Moreover, although the embodiments of the wrapping mechanism protection device and corresponding parts thereof consist of certain geometrical configurations as explained and illustrated herein, not all of these components and geometries are needed and thus should not be taken in their restrictive sense. It is to be understood, as also apparent to a person skilled in the art, that other suitable components and cooperation thereinbetween, as well as other suitable geometrical configurations, may be used for the wrapping mechanism protection device, as will be briefly explained herein and as can be easily inferred herefrom by a person skilled in the art. It will also be appreciated that positional descriptions such as "downstream", "upstream", "above", "below", "left", "right" and the like should, unless otherwise indicated, be taken in the context of the figures and correspond to the position and orientation of the wrapping mechanism protection device and corresponding parts shown in the Figures, with "upstream" corresponding to a position closer to a bale loading support structure of the bale wrapping apparatus and "downstream" corresponding to a position closer to a bale unloading support structure of the bale wrapping apparatus. Positional descriptions should not be considered limiting.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

Referring now to the drawings and more particularly to FIGS. 1, 2, 3A-3C and 4A-4C, there is shown a bale wrapping apparatus 20, which is provided with a wrapping mechanism protection device 84 adapted and configured to prevent the wrapping film 36 that is being dispensed to interface with crop splinters extending from the formed bale 30 such as, for example and without being limitative corn straw debris or the like, when the bale 30 is positioned in the bale wrapping mechanism of the bale wrapping apparatus and is being wrapped.

Figure 1:
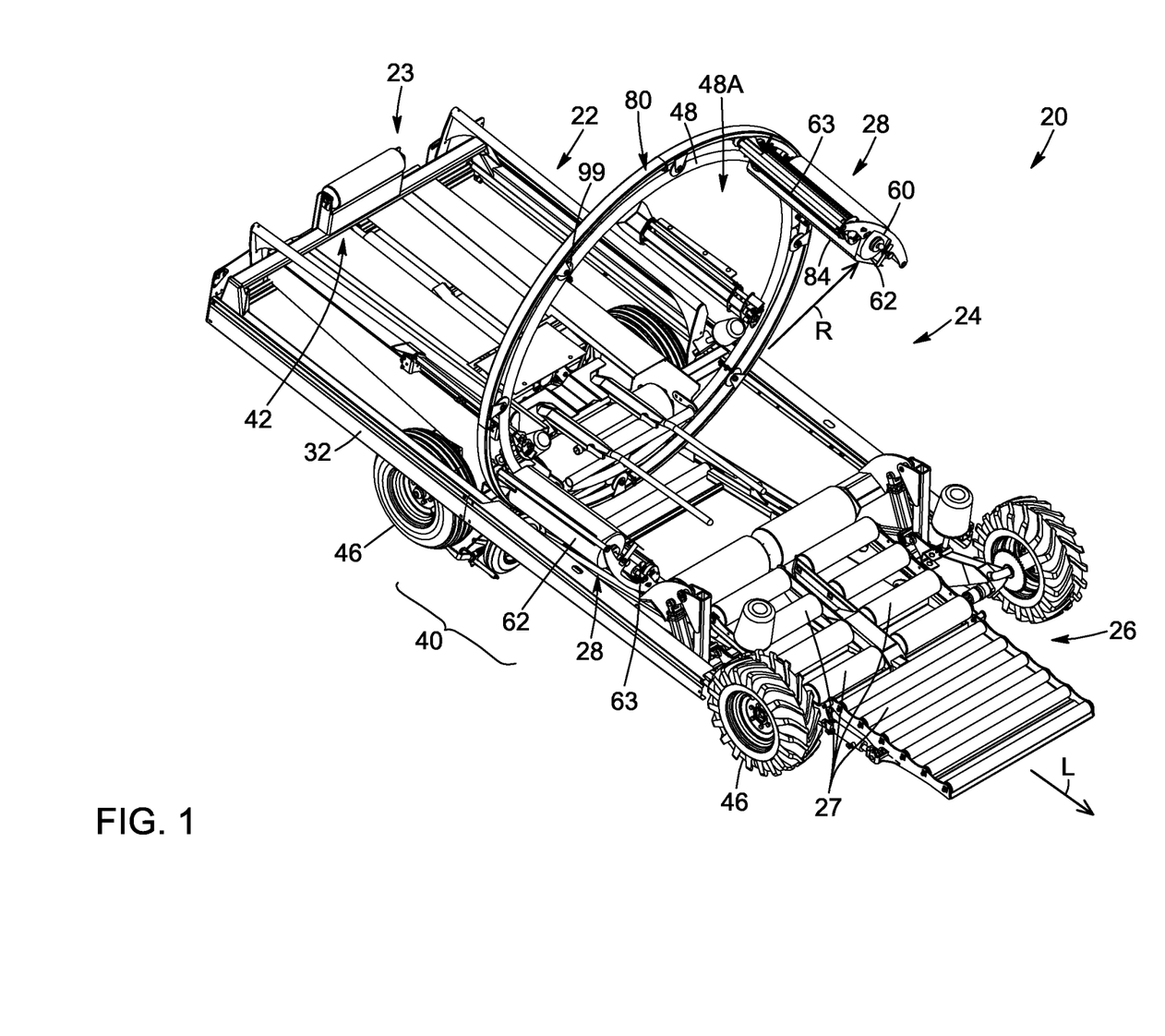
FIG. 1 is an isometric view of a bale wrapping apparatus in accordance with an embodiment and where bale wrapping apparatus is configured in an inline bale wrapping configuration.
Figure 2:
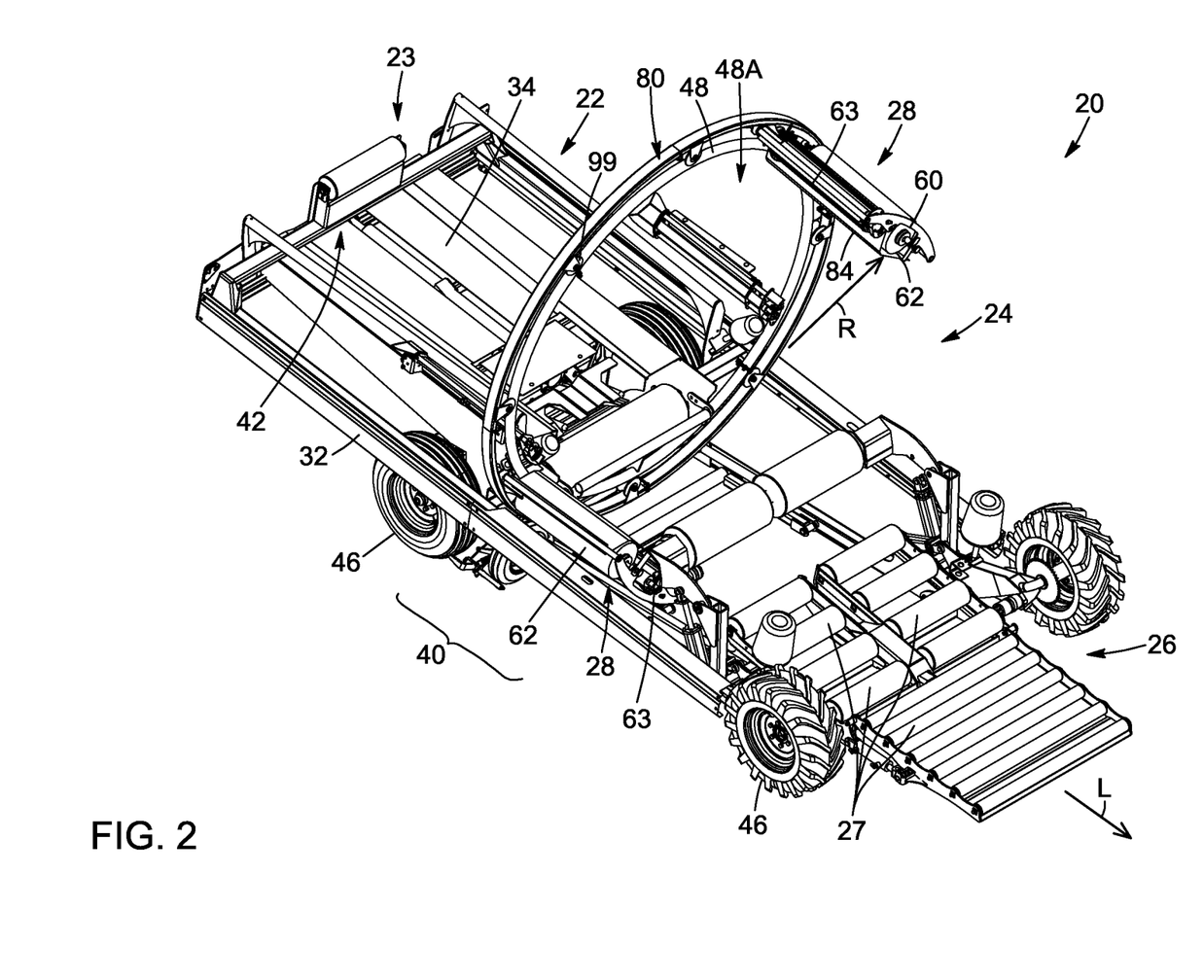
FIG. 2 is an isometric view of the bale wrapping apparatus of FIG. 1, where bale wrapping apparatus is configured in a single bale wrapping configuration.

Referring more particularly to FIGS. 1 and 2, there is shown a bale wrapping apparatus 20 for wrapping bales of crop such as, for example and without being limitative, hay, haylage, straw, corn straw, etc. or any combination thereof. The bales usually have a cylindrical shape or a square shape and are wrapped with plastic film to promote, for instance, fermentation in the production of fodder or silage. In the agricultural field, bales are typically wrapped individually or inline (i.e. in a tube of multiple bales). In the case of individual wrapping of cylindrical bales, the bales are individually wrapped on their rounded peripheral surface and on their substantially flat ends. In the case of inline wrapping (i.e. multiple wrapping), multiple bales are successively wrapped on their rounded peripheral surface. The substantially flat ends of the first and last bales of the tube which define the extremities of the tube of successive bales can also be wrapped to ensure sealing of the tube and prevent spoilage of the fodder. One skilled in the art will understand that, wrapping of the substantially flat ends of the first and last bales of the tube which define the extremities of the tube can be performed before or after the inline wrapping described below and will not be described in detail herein. The tubes may have various lengths according to the number of bales wrapped, no specific limitations being created by the apparatus for the number of successive bales that can be wrapped in the inline bale wrapping configuration.

As will be easily understood by one skilled in the art, the bale wrapping apparatus 20 described herein is presented as an apparatus designed for wrapping bales, but it could also be used to wrap other objects such as and without being limitative boxes, packages, bundles of items or the like.

In the embodiment shown in FIGS. 1 and 2, the bale wrapping apparatus 20 is configurable between an inline bale wrapping configuration (FIG. 1) where the apparatus 20 is configured to receive bales in a longitudinal orientation (i.e. to receive the bales in an orientation where they are longitudinally substantially parallel to a longitudinal axis L), and a single bale wrapping configuration (FIG. 2) where the bale wrapping apparatus 20 is configured to receive rounded bales in a crosswise orientation (i.e. to receive the bales in an orientation where they are longitudinally substantially perpendicular to the longitudinal axis L. One skilled in the art will however understand that, in an embodiment, the bale wrapping apparatus 20 could operate only in an inline bale wrapping configuration (as shown in FIG. 1) or a single bale wrapping configuration (as shown in FIG. 2), the wrapping mechanism protection device 84 which will be described in more details below, being independent from the wrapping configuration of the bale wrapping apparatus 20. In fact, both configurations are shown herein to show the versatility of the wrapping mechanism protection device 84, which can be used in either or both configurations of the bale wrapping apparatus 20.

In the embodiment shown, the bale wrapping apparatus 20 comprises a bale loading support structure 22, a bale wrapping mechanism 24 and a bale unloading support structure 26 positioned successively along the longitudinal axis L of bale wrapping apparatus 20. The bale wrapping apparatus 20 also comprises a chassis 32 onto which the bale loading support structure 22, the bale wrapping mechanism 24 and the bale unloading support structure 26 are mounted.

The bale loading support structure 22 defines a receiving end 23 and is sized, shaped and/or configured such as to receive unwrapped bales. In an embodiment, the bale loading support structure 22 also comprises a bale biasing member 42 (or pusher) which is movable longitudinally along the bale loading support structure 22 (i.e. movable in a direction substantially parallel to longitudinal axis L) to push an unwrapped bale towards wrapping section 40.

The bale unloading support structure 26 is positioned downstream of wrapping section 40 and is sized, shaped and configured such as to receive wrapped bales from the bale wrapping mechanism 24, with the bales travelling onto the bale unloading support structure 26, towards an adjacent ground surface. In the embodiment shown, the bale unloading support structure 26 includes a plurality of free rolling rollers 27 operating as conveying elements to favor the movement of the bales on bale unloading support structure 26 and towards the adjacent ground surface. One skilled in the art will however understand that other types of conveying elements could alternatively be used.

Still referring to FIGS. 1 and 2, there is shown that the bale wrapping mechanism 24 is positioned in the wrapping section 40 defined between the bale loading support structure 22 and the bale unloading support structure 26 along the longitudinal axis L of the bale wrapping apparatus 20. The bale wrapping mechanism 24 defines a rotation axis R which is substantially perpendicular to the longitudinal axis L. The bale wrapping mechanism 24 includes a frame 48 and a film-carrying device 28 which is drivable onto/along frame 48 to rotate around a bale.

The frame or hoop 48 is mounted to the chassis 32 of the bale wrapping apparatus 20 and extends perpendicularly to the longitudinal axis L, between lateral portions/edges of the chassis 32. The frame 48 is adjacent to a downstream portion of the bale loading support structure 22. The frame 48 defines a void middle section or middle section aperture 48A and is shaped and sized such as to receive a bale positioned in the wrapping section 40, in the void middle section 48A thereof, with the frame 48 surrounding a section of the bale positioned in the wrapping section 40. The frame 48 defines an annular shape. In the course of the present disclosure, the term "annular" is used to refer to a shape defining a ring around a center void and which can have a circular shape or a non-circular shape (e.g. hexagonal shape, octagonal shape, square shape) with rounded corners, to allow a smooth movement of the film-carrying device 28 to be performed around a bale. The film-carrying device 28 is operatively and slidably mounted to the frame 48 and is movable/slidable along the periphery of frame 48 to be driven around a bale positioned in the wrapping section 40. Therefore, it can be appreciated that the frame 48 may have any appropriate size, shape and/or configuration which would allow film-carrying device 28 to dispense film around a bale.

In order to dispense film and to cover at least part of a bale passing within the middle section or middle section aperture 48A of the frame 48, the film-carrying device 28 comprises a spool holder 60 for rotatably mounting a spool 62 of wrapping film. The film-carrying device 28 also includes a tensioner 63 for tensioning the wrapping film being dispensed and further, for wrapping around a bale as the film-carrying device 28 is driven around the bale. As illustrated, frame 48 of bale wrapping mechanism 24 extends substantially perpendicular with respect to the longitudinal axis L.

Referring now more particularly to FIGS. 1, 2, 5, 6 and 7, there is shown in more details the bale wrapping mechanism 24 for wrapping a bale, such as bale 30 which is received therein, using wrapping film 36. Indeed, as defined above, the bale wrapping mechanism 24 comprises the frame 48 which defines a perimeter 80 configured such as to circumference the bale 30. The frame 48 further defines the middle section aperture 48A, which is configured to receive the bale 30 therein. The bale wrapping mechanism 24 further comprises the film-carrying device 28 which is operatively mounted to the frame 48 for travelling along perimeter 80 and for dispensing wrapping film 36 to at least partially wrap the bale 30.

Figure 5:
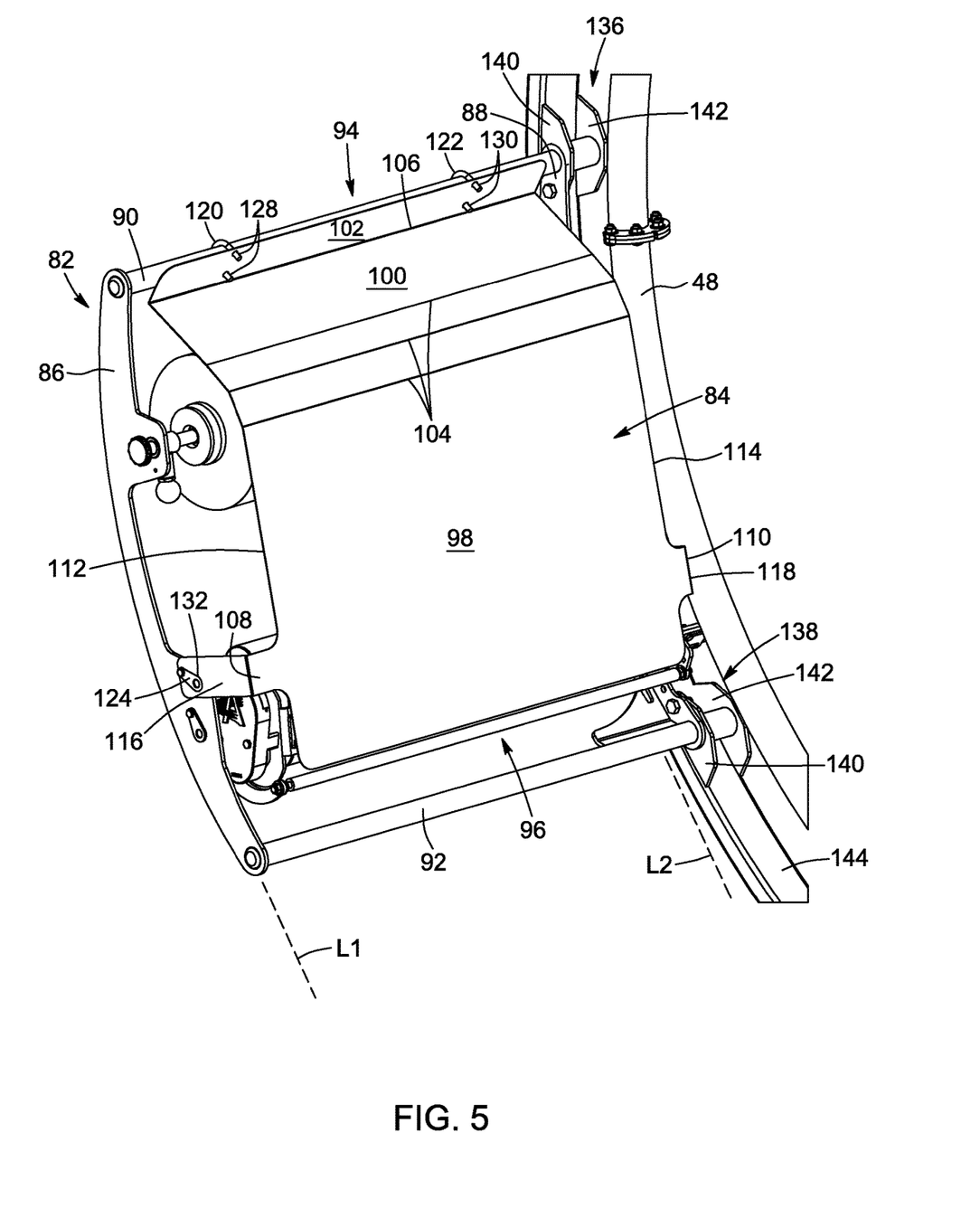
FIG. 5 is a top perspective view of the film-carrying device in accordance with an embodiment.
Figure 6:
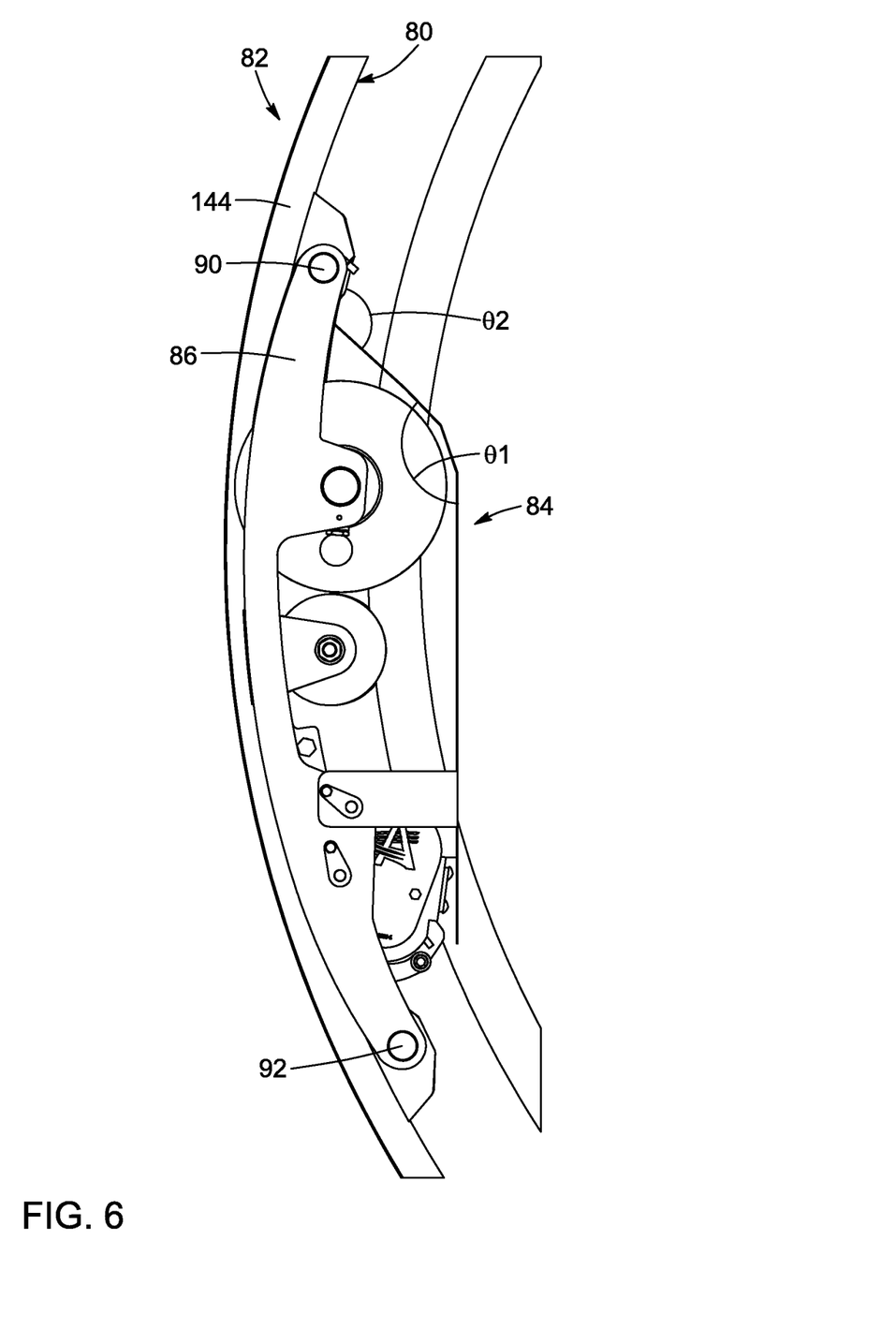
FIG. 6 is a side elevation view of the film-carrying device of FIG. 5.
Figure 7:
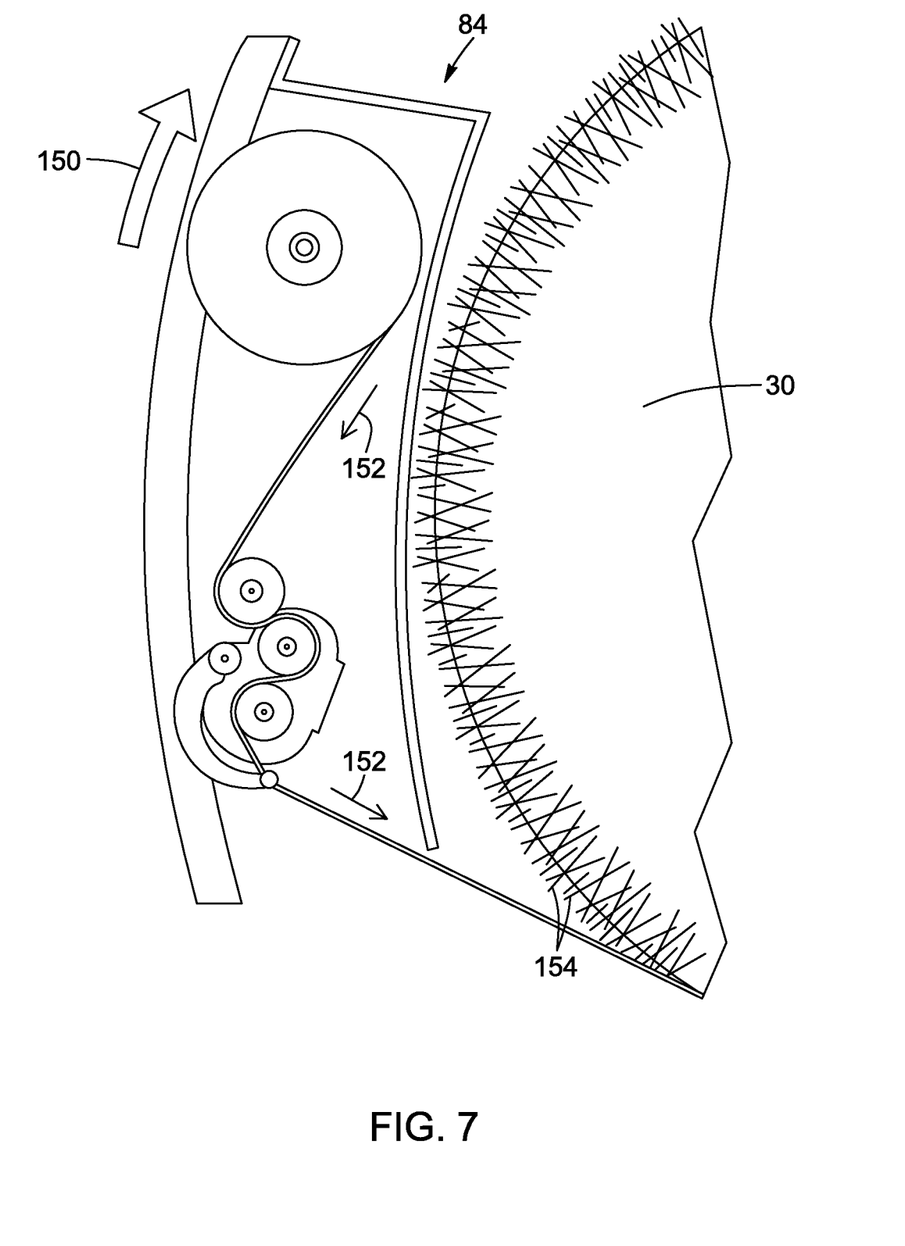
FIG. 7 is a schematic cross-sectional side view of the film-carrying device of FIG. 5 dispensing a wrapping film on a bale.

As best illustrated in FIGS. 5, 6 and 7, the film-carrying device 28 comprises a film-carrying main frame 82, with the spool holder 60 being rotatably mounted on the film-carrying main frame 82 for mounting the spool 62 of wrapping film 36 thereon, and the tensioner 63, which is mounted on the film-carrying main frame 82 at a distance from the spool holder 60, for tensioning the wrapping film 36 being dispensed (see FIG. 7). The film-carrying device 28 further comprises a wrapping mechanism protection device 84, which extends from the film-carrying main frame 82. The wrapping mechanism protection device 84 is configured to prevent the bale 30 received in the frame 48 (e.g. the debris (i.e., strings, threads, strands etc.) extending from or provided by the bale 30) to interface with the wrapping film (i.e. with the spool 62 of wrapping film 36, the tensioner 63, and/or the wrapping film 36 extending therefrom or in-between), when the bale 30 is being wrapped. Indeed, the wrapping mechanism protection device 84 is configured to prevent wrapping film 36 dispensed from the spool 62 towards the tensioner 63 and/or from the tensioner 63 to the bale 30, to interface with splinters (e.g. stems, stalks, twigs, or the like) extending from the bale 30.

Even though the wrapping mechanism protection device 84 is shown to extend from the film-carrying main frame 82, it is important to be mentioned that a person skilled in the art to which the bale wrapping mechanism 24 pertains would understand that, instead of extending from the film-carrying main frame 82, the wrapping mechanism protection device 84 could extend directly from the frame 48, or from any other component of the bale wrapping apparatus 20, while still running along the perimeter 80 of the frame 48 together with the film-carrying device 28 and preventing the bale 30 received in the frame 48 to interface with the spool 62 of wrapping film 36 and/or with the tensioner 63, when the bale 30 is being wrapped (or at least as it prevents interfacing with the spool 62 of wrapping film 36 and with wrapping film 36 being dispensed from spool 62 and travelling towards tensioner 63).

Still referring to FIGS. 5, 6 and 7, there is shown that the film-carrying main frame 82 comprises spaced apart longitudinal members 86, 88 which are configured to rotatably mount the spool holder 60 and to receive the tensioner 63. The film-carrying main frame 82 further comprises a first transversal member 90 which joins the spaced apart longitudinal members 86, 88, as well as a second transversal member 92, which is found at a distance from the first transversal member 90. As illustrated, the second transversal member 92 also joins the spaced apart longitudinal members 86, 88. The longitudinal member 86 defines a first longitudinal member axis L1, the longitudinal member 88 defines a second longitudinal member axis L2, the first transversal member 90 defines a first transversal member axis T1, while the second transversal member 92 defines a second transversal member axis T2. As shown, the first and second member longitudinal axis L1, L2 are being oriented substantially perpendicularly to the first and second member transversal axis T1, T2.

Still referring to FIGS. 5, 6 and 7, there is further shown that the wrapping mechanism protection device 84 defines first and second ends 94, 96. In the embodiment shown, the first end 94 of the wrapping mechanism protection device 84 is mounted on the first transversal member 90, while the second end 96 of the wrapping mechanism protection device 84 is mounted on the spaced apart longitudinal members 86, 88, as it will be described in more details below.

In the embodiment shown, the wrapping mechanism protection device 84 defines a first surface 98, a second surface 100 which extends from first surface 98 at a first angle θ1, as well as a third surface 102 which extends from second surface 100 at a second angle θ2. The first surface 98, second surface 100 and third surface 102 may be integrally formed and for example, folded within a single sheet of material, such as, for example and without being limitative, a plastic, sheet, a metallic material sheet or the like. Indeed, a first group of folds 104 may be provided between the first surface 98 and the second surface 100 (the second surface 100 being inwardly folded relatively to the first surface 98 at the first group of folds 104), while a second fold 106 may be provided between the second surface 100 and the third surface 102 (the third surface 102 being outwardly folded relatively to the second surface 100 at the second fold 106, θ2 defining a substantially perpendicular angle).

Even though the wrapping mechanism protection device 84 is being illustrated as defining the first surface 98, the second surface 100 and the third surface 102, it is to be noted that a person skilled in the art to which bale wrapping mechanism 24 pertains would understand that the wrapping mechanism protection device 84 may take any shape, size and/or configuration, while still allowing the film-carrying device 28 to operatively run along the perimeter 80 of the frame 48 and prevent the bale 30 received in frame 48 to interface with the spool 62 of wrapping film 36 and/or with the tensioner 63 (most importantly, with spool 62 and further, with wrapping film 36 dispensed from spool 62 and travelling towards the tensioner 63), when the bale 30 is being wrapped.

Still referring to FIGS. 5, 6 and 7, there is shown that the wrapping mechanism protection device 84 further defines space apart longitudinal edges 112, 114. The wrapping mechanism protection device 84 further comprises spaced apart connection sections 116, 118. Each one of the paced apart connection sections 116, 118 downwardly extends from the first surface 98 at respectively spaced apart longitudinal edges 112, 114 to connect the wrapping mechanism protection device 84 to the film-carrying main frame 82. A third fold 108 and a fourth fold 110 may therefore be provided between the first surface 98 of wrapping mechanism protection device 84 and respectively spaced apart connection sections 116, 118. Indeed, each one of spaced apart connection sections 116, 118 extends substantially perpendicularly from first surface 98 of wrapping mechanism protection device 84.

Once again, a person skilled in the art to which bale wrapping mechanism 24 pertains would understand that connecting the wrapping mechanism protection device 84 to the film-carrying main frame 82, or to any other component of the bale wrapping mechanism 24 or of bale wrapping apparatus 20, may take any form while still allowing the wrapping mechanism protection device 84 to provide a protection separating the bale 30 from the spool 62 of wrapping film 36 and further, from tensioner 63 (but most importantly, from the wrapping film 36 being dispensed from the spool 62 and travelling towards the tensioner 63).

According to the present scenario, a first fastener 120 and a second fastener 122 are provided to connect the first end 94 of the wrapping mechanism protection device 84 with the first transversal member 90 via apertures 128, 130 located in the third surface 102. A third fastener 124 is provided to connect the connection section 116 found about the second end 96 of wrapping mechanism protection device 84 with the longitudinal member 86 via aperture 132 located on connection section 116, while a fourth fastener (not shown) is provided to connect the connection section 118 found about second end 96 of wrapping mechanism protection device 84 with the longitudinal member 88 via an aperture (not shown). Indeed, the connection sections 116, 118 perpendicularly extends from the wrapping mechanism protection device 84 at spaced apart longitudinal edges 112, 114.

Other configurations of wrapping mechanism protection device 84 are however possible. For example, a wrapping mechanism protection device may take the form or shape of a casing with side walls which would totally cover the spool holder 60 and/or tensioner 63 and which would extend along the full length of both longitudinal members 86, 88 (according to that scenario, it would not be possible to reach the spool 62 and/or tensioner 63 from one or the other of the sides of the film-carrying device 28). A person skilled in the art to which the bale wrapping mechanism 24 pertains would understand that the film-carrying main frame 82 and wrapping mechanism protection device 84 may further be integrally formed.

Still referring to FIGS. 5, 6 and 7, there is shown that the film-carrying device 28 further comprises a first mounting member 136 and a second mounting member 138, found at a distance from the first mounting member 136, which both extends from the longitudinal member 88. Indeed, the first mounting member 136 is located at the intersection of the longitudinal member 88 and the first transversal member 90, while the second mounting member 138 is located at the intersection of the longitudinal member 88 and the second transversal member 92. The first and second mounting members 136, 138 are configured to mount the film carrying device 28 on a rotatable annular member 144 extending along a perimeter 80 of the frame 48 and rotatable about the frame 48, to rotate the film carrying device 28 repetitively around the bale 30 received in the void middle section 48A of the frame 48. In an embodiment, the rotatable annular member 144 includes a plurality of roller assemblies 99 (See FIGS. 1 and 2) engaging an outer surface of the frame 48 to allow the rotatable annular member 144 to rotate thereabout when set in rotation, for example by a motor (not shown).

In the embodiment shown, each one of first and second mounting members 136, 138 comprises a first plate 140 and a second plate 142, spaced apart from the first plate 140 and mounted to opposed sides of a corresponding section of the rotatable annular member 144. As shown, the first transversal member 90 will receive the first and second longitudinal members 86, 88, as well as the first and second plates 140, 142 of the first mounting member 136, while the second transversal member 92 will receive the first and second longitudinal members 86, 88, as well as the first and second plates 140, 142 of the second mounting member 138. A person skilled in the art to which the bale wrapping mechanism 24 pertains would however understand that connecting the film-carrying device 28 to the frame 48 may take any form and therefore, that the first and second mounting member 136, 138 and the rotatable annular member 144 may take any shape, size and/or configurations to allow the spool 62, tensioner 63 and wrapping mechanism protection device or deflector 84 to travel along the perimeter 80 of the frame 48, while protecting wrapping film 36 dispensed from spool 62 and travelling towards tensioner 63 from splinters 154 of bale 30 (see for example FIG. 7).

Now referring more particularly to FIG. 7, there is shown that, once the film-carrying device 28 is in a wrapping operation and travels along the perimeter 80 of the frame 48 in the direction of arrow 150, the wrapping film 36 is being dispensed in the direction of arrows 152 from spool 62 towards tensioner 63, and further, from tensioner 63 towards bale 30. Thanks to the positioning and configuration of the wrapping mechanism protection device or deflector 84, splinters 154 of corn straw or the like, are prevented from interfacing with the wrapping film 36 of the film-carrying device 28. Such configuration of the wrapping mechanism protection device or deflector 84 significantly reduces chances of perforating wrapping film 36 by splinters 154 from the bale 30, prior to the film 36 reaching bale 30.

Now referring to FIGS. 1 to 4B, in both the inline bale wrapping configuration (FIGS. 1 and 3A to 3C) and the single bale wrapping configuration (FIGS. 2 and 4A, 4B), the film-carrying device 28 rotates around one bale 30 (or multiple bales) to dispense wrapping film 36 and wrap the corresponding bale positioned in wrapping section 40. The distinction between the inline bale wrapping configuration (FIGS. 1 and 3A to 3C) and the single bale wrapping configuration (FIGS. 2 and 4A, 4B) is that, in the inline bale wrapping configuration, the bales 30A, 30B, 30C, 30D, 30E are maintained in the same angular position as they move through the wrapping section 40 and towards bale unloading support structure 26, while, in the single bale wrapping configuration, the bale 30 is driven in rotation about rotation axis R while it is being wrapped in wrapping section 40. In the inline bale wrapping configuration multiple bales 30A, 30B, 30C, 30D, 30E can be wrapped successively in a single tube (as shown in FIG. 3B)

Inline Bale Wrapping

Figure 3A:
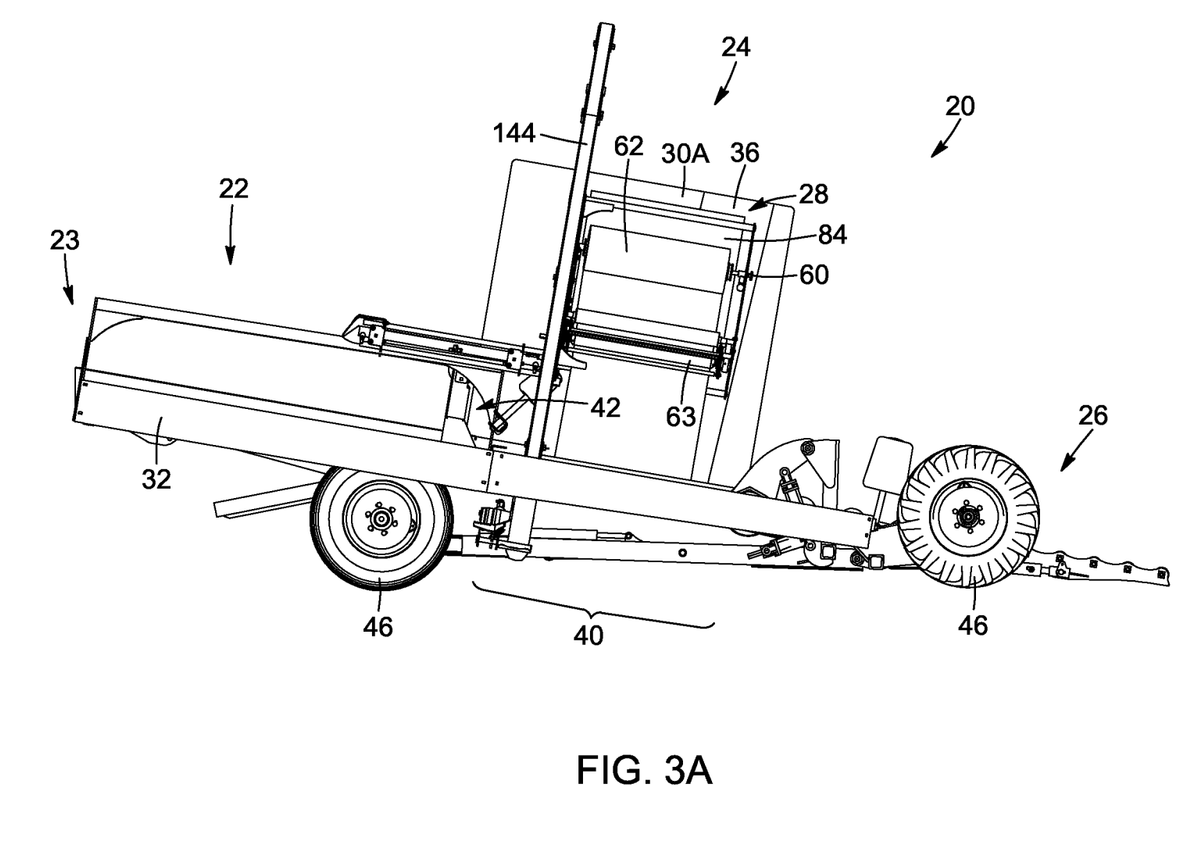
FIGS. 3A and 3B are respectively a left side elevation view and a front elevation view of the wrapping apparatus with the first bale being in a wrapping section of the apparatus and further, being wrapped by a bale wrapping mechanism.
Figure 3B:
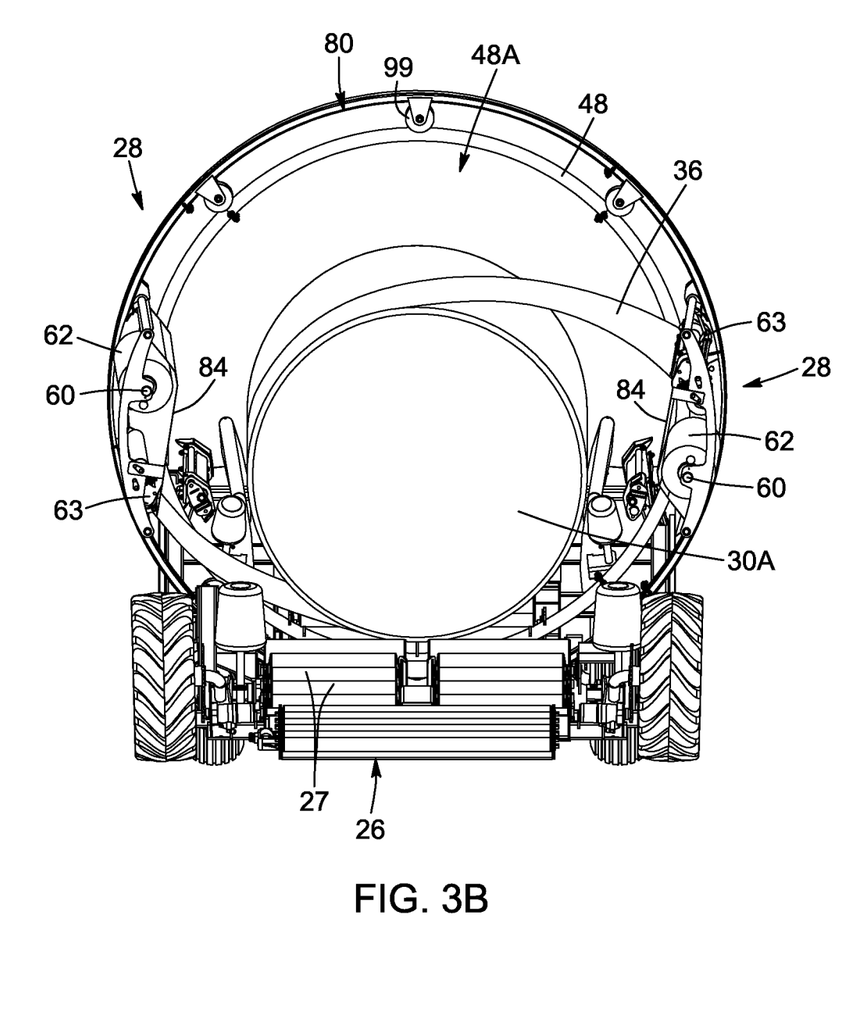
Figure 3C:
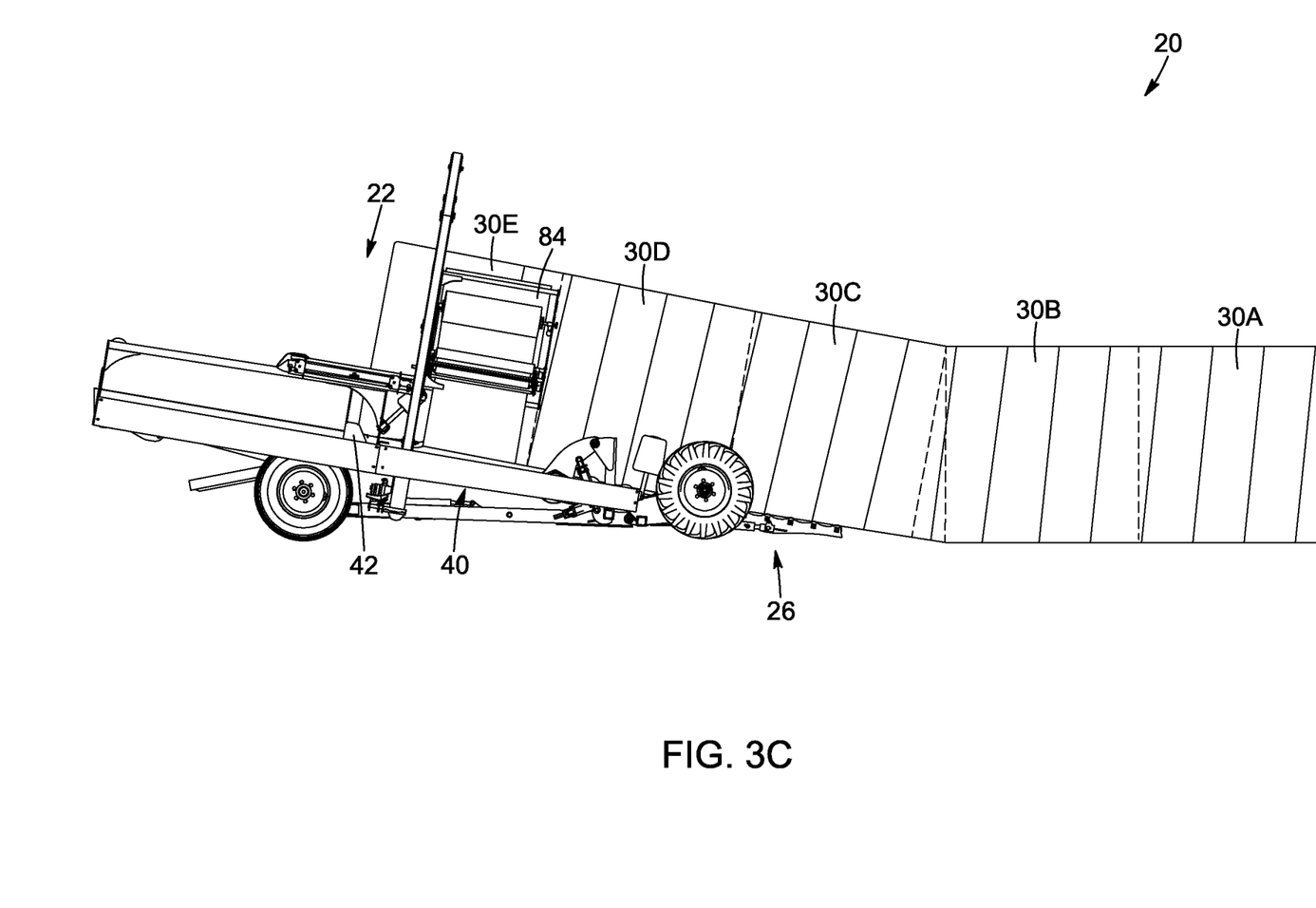
FIG. 3C is a left side elevation view of the wrapping apparatus with multiple bales being wrapped in a single tube.

FIGS. 3A to 3C show multiple bales 30A, 30B, 30C, 30D, 30E are being wrapped in a single wrapping tube, as the apparatus is configured in the inline wrapping configuration.

FIGS. 3A and 3B show a first bale 30A being displaced from the bale loading support structure 22 to the wrapping section 40 by the bale biasing member 42 being moved longitudinally towards wrapping section 40. In FIGS. 3A and 3B, the first bale 30A is being partly wrapped into wrapping film 36 by the bale wrapping mechanism 24.

FIG. 3C shows multiple bales being wrapped by being successively pushed from the bale loading support structure 22 towards the wrapping section 40 by the bale biasing member 42 being longitudinally displaced towards the wrapping section 40. The forward surface of each new bale being pushed into the wrapping section 40 is pressed against a rearward surface of a corresponding downstream bale, such that upstream bale pushes the downstream bale out of the wrapping section 40 and onto the bale unloading support structure 26. The new bale being positioned in the wrapping section 40 is therefore also wrapped in wrapping film 36 by the bale wrapping mechanism 24, such that the multiple bales 30A, 30B, 30C, 30D, 30E, are being wrapped in a single wrapping tube.

Single Bale Wrapping

Figure 4A:
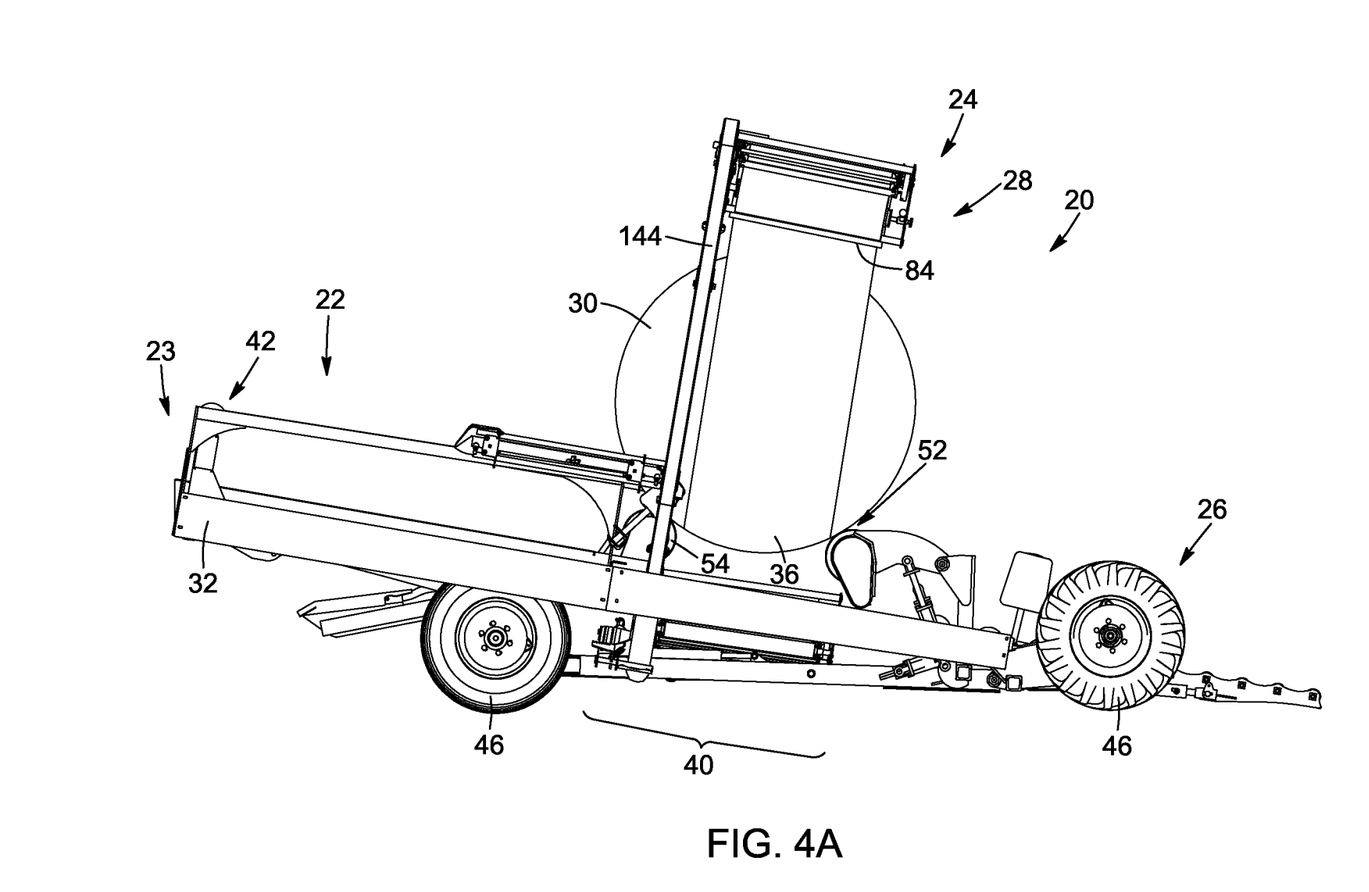
FIGS. 4A and 4B are respectively a left side elevation view and a front elevation view of the wrapping apparatus with the bale being positioned in the wrapping section during the wrapping process.
Figure 4B:
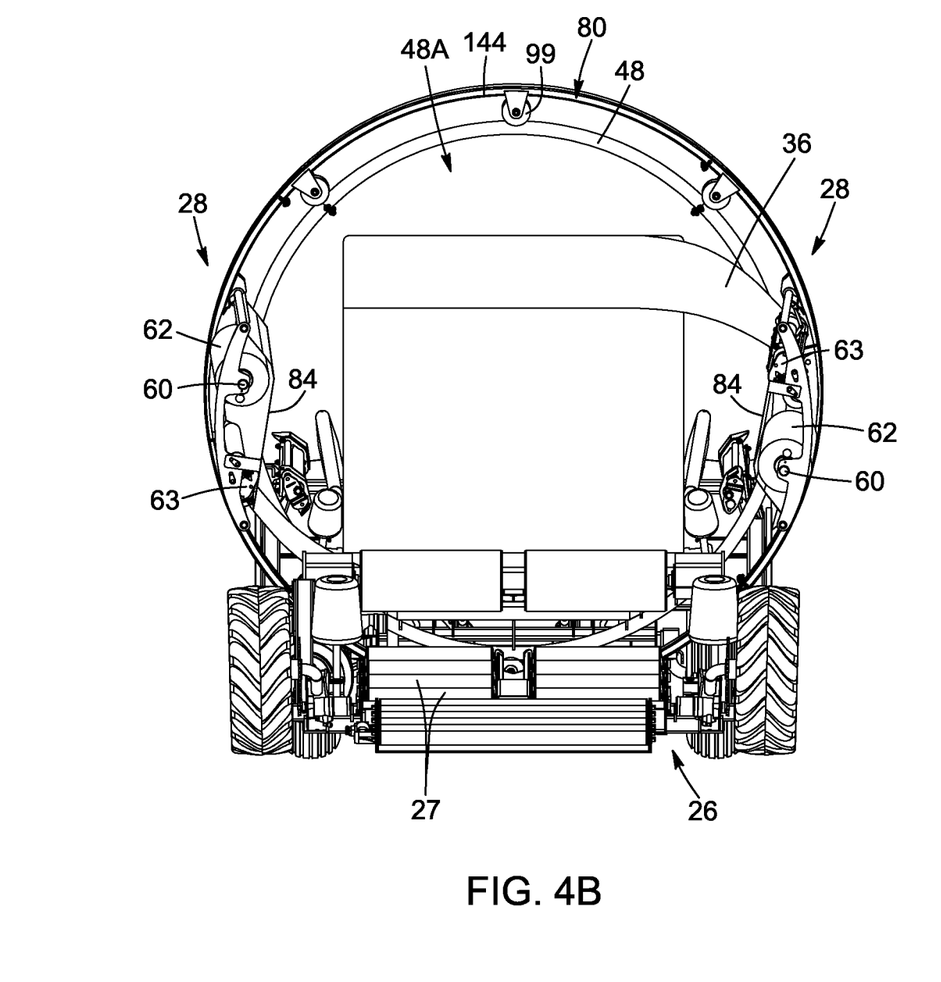

FIGS. 4A and 4B show a bale 30 being wrapped, as the apparatus is configured in the single bale wrapping configuration, in order to wrap bales individually.

FIGS. 4A and 4B show the film-carrying device 28 being brought in movement along frame 48 and therefore, around bale 30, to cover an outer surface of the bale 30 with wrapping film 36, as the bale 30 is rotated along rotation axis R, in order to cover the entire surface defined by bale 30 with wrapping film 36.

Referring to FIGS. 1 to 4B and 7, as mentioned above, once the film-carrying device 28 is in the wrapping operation and travels along the perimeter 80 of frame 48 in the direction of arrow 150, wrapping film 36 is being dispensed in the direction of arrows 152 from the spool 62 towards the tensioner 63, and further, from tensioner 63 towards the single bale 30 being wrapped or the corresponding one of the multiple unwrapped bales 30A, 30B, 30C, 30D, 30E. Thanks to the positioning and configuration of wrapping mechanism protection device or deflector 84, splinters 154 of corn straw or the like, are prevented from interfacing with wrapping film 36 found in film-carrying device 28, which significantly reduces the chances of perforating the wrapping film 36 by splinters 154 from the bale 30 prior to the wrapping film 36 reaching the single bale 30 being wrapped or the corresponding one of the multiple unwrapped bales 30A, 30B, 30C, 30D, 30E.

In view of the above, thanks to the positioning and configuration of the wrapping mechanism protection device or deflector 84, splinters 154 of corn straw or the like, are prevented from interfacing with the wrapping film 36 found in the film-carrying device 28. As mentioned above, this results in a significant reduction of the probabilities of perforation of the wrapping film 36 by splinters 154 prior it reaches bale 30, which is advantageous as it provides overall greater integrity and water and humidity tightness of the wrapping film covering provided over the bale 30.

In an embodiment, the bale wrapping apparatus 20 further comprises moving means such as wheels 46 to enable wrapping of bales and displacement of bale wrapping apparatus 20 in a field for example. It can be appreciated that bale wrapping apparatus 20 can comprise other moving means or that it can be stationary.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A bale wrapping mechanism for wrapping a bale received therein with a wrapping film, the bale wrapping mechanism comprising:
 a frame defining a perimeter configured to circumference the bale and a middle section aperture configured to receive the bale therein; and
 a film-carrying device operatively mounted to the frame for travelling along the perimeter and for dispensing the wrapping film to at least partially wrap the bale, the film-carrying device comprising:
 a film-carrying main frame;
 a spool holder rotatably mounted on the film-carrying main frame for mounting a spool of the wrapping film thereon; and
 a wrapping mechanism protection device extending from at least one of the frame and the film-carrying main frame and extending between at least a section of the bale and a portion of the wrapping film to prevent the bale received in the frame to interface with the portion of the wrapping film when the bale is being wrapped.

2. The bale wrapping mechanism of claim 1, wherein the film-carrying device further comprises a tensioner mounted on the film-carrying frame at a distance from the spool holder for tensioning the wrapping film being dispensed, the wrapping mechanism protection device being further configured to prevent the bale received in the frame to interface with the dispensed wrapping film traveling towards the tensioner when the bale is being wrapped.

3. The bale wrapping mechanism of claim 1, wherein the film-carrying main frame comprises spaced apart longitudinal members extending substantially vertically, for rotatably mounting the spool holder.

4. The bale wrapping mechanism of claim 3, wherein the film-carrying main frame further comprises a first transversal member extending substantially horizontally and joining the spaced apart longitudinal members.

5. The bale wrapping mechanism of claim 4, wherein the film-carrying main frame further comprises a second transversal member extending substantially horizontally and distant from the first transversal member, the second transversal member joining the spaced apart longitudinal members.

6. The bale wrapping mechanism of claim 5, wherein one of the spaced apart longitudinal members defines a first longitudinal member axis, the other one of the spaced apart members defines a second longitudinal member axis, the first transversal member defines a first transversal member axis, the second transversal member defines a second transversal member axis, the first and second longitudinal member axis being substantially perpendicular to the first and second transversal member axis.

7. The bale wrapping mechanism of claim 5, wherein the wrapping mechanism protection device defines an upper end and a lower end, at least one of the upper end and the lower end of the wrapping mechanism protection device being mounted to at least one of the first and second transversal members.

8. The bale wrapping mechanism of claim 7, wherein the upper end of the wrapping mechanism protection device is being mounted on the first transversal member.

9. The bale wrapping mechanism of claim 1, wherein the wrapping mechanism protection device defines a first surface and a second surface extending from the first surface at a first angle.

10. The bale wrapping mechanism of claim 9, wherein the wrapping mechanism protection device defines a third surface extending from the second surface at a second angle.

11. The bale wrapping mechanism of claim 1, wherein the wrapping mechanism protection device defines spaced apart longitudinal edges defined at opposed lateral ends of the wrapping mechanism protection device and further wherein the wrapping mechanism protection device comprises spaced apart connection sections each extending from a corresponding one of the longitudinal edges to connect the wrapping mechanism protection device to the film-carrying main frame.

12. The bale wrapping mechanism of claim 11, wherein a first spaced apart connection sections extends from the first surface of the wrapping mechanism protection device at one of the spaced apart longitudinal edges, and further wherein a second spaced apart connection sections extends from the first surface of the wrapping mechanism protection device at the other one of the spaced apart longitudinal edges.

13. The bale wrapping mechanism of claim 1, wherein the wrapping mechanism protection device is releasably coupled to the film-carrying main frame.

14. A film-carrying device for a bale wrapping mechanism adapted to wrap a bale received therein with a wrapping film, the bale wrapping mechanism comprising a frame defining a perimeter configured to circumference the bale and a middle section aperture configured to receive the bale therein, the film carrying device being adapted to be operatively mounted to the frame for travelling along the perimeter and to dispense the wrapping film to at least partially wrap the bale, the film-carrying device comprising:
 a film-carrying main frame;
 a spool holder rotatably mounted on the film-carrying main frame for mounting a spool of the wrapping film thereon; and
 a wrapping mechanism protection device extending from the film-carrying main frame and extending between at least a section of the bale and a portion of the wrapping film to prevent the bale received in the frame to interface with the portion of the wrapping film when the bale is being wrapped.

15. The film-carrying device of claim 14, further comprising a tensioner mounted on the film-carrying frame at a distance from the spool holder for tensioning the wrapping film being dispensed, the wrapping mechanism protection device being further configured to prevent the bale received in the frame to interface with the dispensed wrapping film travelling from the spool holder towards the tensioner when the bale is being wrapped.

16. The film-carrying device of claim 14, wherein the film-carrying main frame comprises spaced apart longitudinal members extending substantially vertically, for rotatably mounting the spool holder, with a first transversal member extending substantially horizontally and joining the spaced apart longitudinal members and a second transversal member extending substantially horizontally at a distance from the first transversal member, the second transversal member also joining the spaced apart longitudinal members.

17. The film-carrying device of claim 16, wherein the wrapping mechanism protection device defines an upper end and a lower end, at least one of the upper end and the lower end of the wrapping mechanism protection device being mounted to at least one of the first and second transversal members.

18. The film-carrying device of claim 14, wherein the wrapping mechanism protection device defines a first surface and a second surface extending from the first surface at a first angle.

19. The film-carrying device of claim 18, wherein the wrapping mechanism protection device defines a third surface extending from the second surface at a second angle.

20. The film-carrying device of claim 14, wherein the wrapping mechanism protection device defines space apart longitudinal edges defined at opposed lateral ends of the wrapping mechanism protection device and further wherein the wrapping mechanism protection device comprises spaced apart connection sections each extending from a corresponding one of the spaced apart longitudinal edges to connect the wrapping mechanism protection device to the film-carrying main frame.

* * * * *